Figures 1, 2:
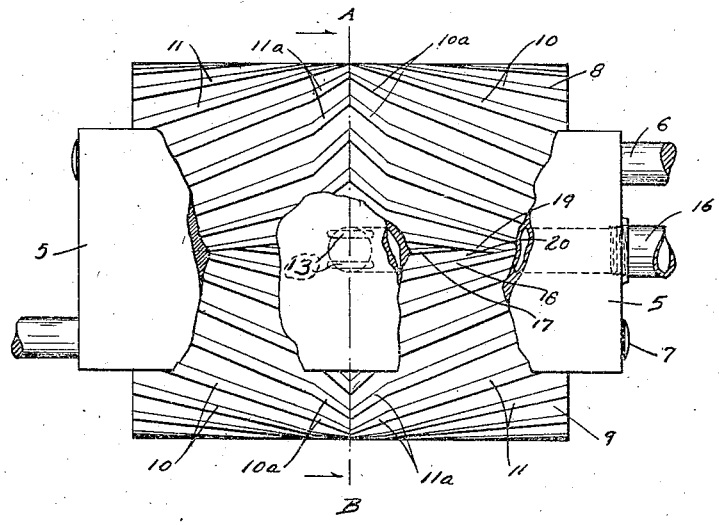

J. H. VAN DEVENTER.
ROTARY ENGINE.
APPLICATION FILED APR. 22, 1912.

1,046,687. Patented Dec. 10, 1912.

WITNESSES:
Walter H. Kelley
Bessie E. Dempsey

INVENTOR
John Herbert Van Deventer
BY J. W. M. Ellis
ATTORNEY

UNITED STATES PATENT OFFICE.

JOHN HERBERT VAN DEVENTER, OF BUFFALO, NEW YORK, ASSIGNOR TO BUFFALO FORGE COMPANY, OF BUFFALO, NEW YORK, A CORPORATION OF NEW YORK.

ROTARY ENGINE.

1,046,687.  Specification of Letters Patent.  Patented Dec. 10, 1912.

Application filed April 22, 1912. Serial No. 692,310.

*To all whom it may concern:*

Be it known that I, JOHN HERBERT VAN DEVENTER, a citizen of the United States of America, residing at Buffalo, in the county of Erie and State of New York, have invented certain new and useful Improvements in Rotary Engines, of which the following is a full, clear, and exact description.

My invention relates to rotary engines and more particularly to engines with rotors, each having a plurality of spirally disposed and intermeshing tooth blades.

In general the objects sought to be obtained by the invention herein described are substantially the same as those set forth in my issued Patent No. 996169 and my pending application, Serial No. 627166.

In producing my invention, I have sought to obtain, specifically, a rotary engine in which the buckets formed between the intermeshing tooth blades shall be lengthened and the volume of said buckets increased, while the angle, which the greater part of said tooth blades make with the axes of the rotors, remains substantially the same as in my other invention. Thus I am able to increase the expansion of said motive fluid in said buckets.

In the specification and the appended claims the term "fluid" will be used as a general term for the pressure medium, but the engine is especially adapted for the use of steam and obviously it is applicable to be driven with either steam or compressed air, as well as any fluid under pressure.

Reference is to be had to the accompanying drawings, forming part of the specification, in which like characters of reference indicate like parts throughout the several views of which:

Figure 1 is a bottom view of my engine with the base broken away and with the intermeshing tooth blades shown diagrammatically. Fig. 2 is a sectional elevation of my engine and is taken on line A—B of Fig. 1, and shows the rotors in a diagrammatic manner.

In the drawings, the numeral 5 represents the base of my engine.

6 and 7 represent the rotor shafts which are rotatably carried in suitable bearings, preferably integral with the base 5. Mounted, in a rigid manner, upon the shafts 6 and 7 respectively, are rotors 8 and 9. Each of the said rotors is provided with a plurality of right-hand spirally disposed tooth blades 10 and $10^a$ which extend across the rotors for substantially one-half of their length and a plurality of left-hand spirally disposed tooth blades 11 and $11^a$ are also provided which extend across the said rotors for substantially the remaining half of their length. The right-hand tooth blades 10 and $10^a$ of one rotor are arranged to mesh with the left-hand tooth blades 11 and $11^a$ of the opposite rotor and as the right-hand and left-hand tooth blades $10^a$ and $11^a$, respectively, meet and join one another at the center of each rotor, buckets are thus formed by the said tooth blades, whereby the propulsion of the rotors is made possible. As the said tooth blades mesh with one another, transmission of rotation is secured between the said rotors without the use of additional gearing. The said right-hand and left-hand tooth blades $10^a$ and $11^a$, respectively, are preferably shorter in length than the right-hand and left-hand tooth blades 10 and 11, respectively, and they are disposed so as to make a greater angle with the axes of the rotors than the said tooth blades 10 and 11.

Represented by the numeral 12 is a rib which is preferably formed integral with the base 5. This rib extends preferably the entire length of the rotors 8 and 9 and extends up in between the said rotors to the point of intersection of their perimeters and is in conformity with said perimeters and in bearing contact therewith. The number of tooth blades in each rotor and the angle which the said tooth blades make with the rotor shafts, govern the extent to which the said rib envelops the said rotors and it is only necessary that this rib extend around the rotors far enough so as to confine the fluid under pressure to any pair of meshing tooth blades until the said pair of tooth blades cease to mesh or until each bucket formed by the intermeshing tooth blades has developed its full volume. It is obvious that if desired the said rib may be continued around the rotors and substantially inclose the same, thus forming a casing in which the exhaust fluid will be confined and from which it may be carried by suitable piping to any desired place. An inlet port 13 is provided in the rib 12 and is disposed near its peak and at a point in its length which is opposite the point of junction of the tooth blades $10^a$ and $11^a$. The said port is disposed preferably in a horizontal plane and extends through from one side of the rib to the other side. Thus when the fluid under pressure enters the said port, it will be caused to impinge on the tooth blades of each rotor at the same time. Communicating with the said inlet port 13 is a port 14 which connects with a port 15. The port 15 extends from the port 14 through the base 5 and is screwthreaded at its outer end, whereby the inlet pipe 16 may be secured to said base.

It will be clearly seen by referring to the drawing, that the tooth blades 17 and 18 on the rotor 9 and tooth blade 19 on the rotor 8 are in mesh and have formed between them a bucket 20. As the rotors are each provided with right-hand and left-hand tooth blades, two buckets will be formed simultaneously, but as each rotor is provided with a plurality of tooth blades, the formation of but one double-sided bucket is started by the intermeshing tooth blades at any one time. When the rotors are revolving, at substantially the instant when a bucket is started the fluid under pressure is made to impinge upon the tooth blades forming such bucket. Thus an impact action is secured and, as the rotors continue to revolve, the capacity or volume of said bucket is greatly increased due to the recession toward the ends of the rotors of the points of mesh of the said tooth blades forming the said bucket. As the rotors are revolving by reason of the bucket being under pressure, the tooth blades forming the side of said bucket when passing the inlet port 12, cut off the supply from said bucket. After the supply has been cut off from any one bucket the fluid contained therein will expand and at the same time exert its increased energy against the points of mesh, or until it has developed its full capacity or volume, or until the tooth blades forming said bucket cease to mesh. Thus, obviously, the ratio of expansion may be changed by changing the size and location of the inlet port or the angle and length of the spirally disposed intermeshing tooth blades.

As hereinbefore stated, the right-hand and left-hand tooth blades 10$^a$ and 11$^a$, respectively, are joined and thus form angular pockets. The fluid under pressure is admitted at this point and it will be seen that leakage of the said fluid at the junction of the said rotors is impossible. As it is possible to make a very good and practically non-leaking contact or bearing between the perimeters of the rotors and the rib, the leakage of fluid in my engine is reduced to a minimum, thus making its efficiency very high.

Obviously some detailed modifications of my invention as herein shown and described may be made without departing from the spirit of my invention or the scope of the appended claims and I do not wish to be limited to the exact embodiment herein shown and described.

Having thus described my invention, what I claim is:

1. In a rotary engine the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, and a fluid inlet provided with a port for conducting fluid under pressure to said rotors, said port being so located and formed that said conducted fluid will be impinged within the angular pockets formed by said tooth blades.

2. In a rotary engine, the combination of two or more intermeshing and engaging rotors, shafts secured in said rotors and rotatably mounted in suitable bearings, each rotor having a plurality of right-hand spirally disposed tooth blades starting from a plurality of circumferential points on said rotors located at one end thereof and extending toward the center of said rotors and a plurality of left-hand spirally disposed tooth blades starting from a plurality of circumferential points on said rotors located at the opposite ends and extending toward the center of said rotors, the inner end portions of each of said tooth blades making a greater angle with the axes of said rotors than the remaining portions, said right-hand and left-hand spirally disposed tooth blades of one rotor meshing, respectively, with said left-hand and right-hand spirally disposed tooth blades of another rotor, whereby buckets are formed by the meshing tooth blades of said rotors, and a fluid inlet provided with a port for conducting fluid under pressure to said rotors, said port being so located and formed that said conducted fluid will be impinged within said buckets formed by said tooth blades.

3. In a rotary engine the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth-blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, said right-hand and left-hand spirally disposed tooth blades of one rotor meshing, respectively, with the said left-hand and right-hand spirally disposed tooth blades of another rotor, whereby buckets are formed between the meshing tooth blades of said rotors, and a fluid inlet provided with a port for conducting fluid under pressure to said rotors, said port being so located and formed that said conducted fluid will be impinged within the angular pockets formed by said tooth blades.

4. In a rotary engine the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, and a fluid inlet provided with a port having lateral passages leading into said pockets, whereby the conducted fluid impacts in said pockets and against said tooth blades substantially in the direction of rotation of said rotors.

5. In a rotary engine the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, and a rib extending substantially parallel to the axes of said rotors and in contact with the perimeters of said rotors for at least a portion of their peripheries, said rib being provided with a port for conducting fluid under pressure to said angular pockets of said rotors.

6. In a rotary engine, the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, and a rib extending substantially parallel to the axes of said rotors and in contact with the perimeters of said rotors for at least a portion of their peripheries, said rib being provided with lateral passages leading into said pockets, whereby the conducted fluid impacts in said pockets and against said tooth blades substantially in the direction of rotation of said rotors.

7. In a rotary engine, the combination of two or more intermeshing and engaging rotors, shafts secured in said rotors and rotatably mounted in suitable bearings, each rotor having a plurality of right-hand spirally disposed tooth blades starting from a plurality of circumferential points on said rotors located at one end thereof and extending toward the center of said rotors and a plurality of left-hand spirally disposed tooth blades starting from a plurality of circumferential points on said rotors located at the opposite ends and extending toward the center of said rotors, the inner end portions of each of said tooth blades making a greater angle with the axes of said rotors than the remaining portions, said right-hand and left-hand spirally disposed tooth blades of one rotor meshing respectively, with said left-hand and right-hand spirally disposed tooth blades of another rotor, whereby buckets are formed between the meshing tooth blades of said rotors and a rib extending substantially parallel to the axes of said rotors in contact with the perimeters of said rotors for at least a portion of their peripheries, said rib being provided with a port for conducting fluid under pressure to said buckets of said rotors.

8. In a rotary engine, the combination of two or more intermeshing and engaging rotors, shafts secured in said rotors and rotatably mounted in suitable bearings, each rotor having a plurality of right-hand spirally disposed tooth blades starting from a plurality of circumferential points on said rotors located at one end thereof and extending toward the center of said rotors and a plurality of left-hand spirally disposed tooth blades starting from a plurality of circumferential points on said rotors located at the opposite ends and extending toward the center of said rotors, the inner end portions of each of said tooth blades making a greater angle with the axes of said rotors than the remaining portions, said right-hand and left-hand spirally disposed tooth blades of one rotor meshing respectively, with said left-hand and right-hand spirally disposed tooth blades of another rotor, whereby buckets are formed between the meshing tooth blades of said rotors, and a rib extending substantially parallel to the axes of said rotors and in contact with the perimeters of said rotors for at least a portion of their peripheries, said rib being provided with lateral passages leading into said pockets, whereby the conducted fluid impacts in said buckets and against said tooth blades substantially in the direction of rotation of said rotors.

9. In a rotary engine, the combination of two or more intermeshing and engaging rotors, shafts secured in said rotors and rotatably mounted in suitable bearings, each of said rotors having a plurality of right-hand spirally disposed tooth blades starting from a plurality of circumferential points on said rotors located at one end thereof and extending toward the center of said rotors, and a plurality of left-hand spirally disposed tooth blades starting from a plurality of circumferential points on said rotors located at the opposite end thereof and extending toward the center of said rotors, the inner end portions of each of said tooth blades making a greater angle with the axes of said rotors than the remaining portions, the said inner end portions of said right and left-hand tooth blades of each rotor meshing and joining and thereby forming angular pockets, and a fluid inlet provided with a port so arranged that the admission of fluid under pressure into any pair of meshing tooth blades is cut off by the succeeding meshing tooth blades before the said first mentioned tooth blades have developed their full capacity.

10. In a rotary engine, the combination of two or more intermeshing and engaging rotors, shafts secured in said rotors and rotatably mounted in suitable bearings, each rotor having a plurality of right-hand spirally disposed tooth blades starting from a plurality of circumferential points on said rotors located at one end thereof and extending toward the center of said rotors and a plurality of left-hand spirally disposed tooth blades starting from a plurality of circumferential points on said rotors located at the opposite ends and extending toward the center of said rotors, the inner end portions of each of said tooth blades making a greater angle with the axes of said rotors than the remaining portions, said right-hand and left-hand spirally disposed tooth blades of one rotor meshing respectively, with said left-hand and right-hand spirally disposed tooth blades of another rotor, whereby buckets are formed between the meshing tooth blades of said rotors and a rib extending substantially parallel to the axes of said rotors and in contact with the perimeters of said rotors for at least a portion of their peripheries, said rib being provided with a port so arranged that the admission of fluid under pressure into any bucket is cut off by the succeeding bucket before the first mentioned bucket has developed its full volume.

In testimony whereof, I have hereunto signed my name in the presence of two subscribing witnesses.

JOHN HERBERT VAN DEVENTER.

Witnesses:
J. WM. ELLIS,
WALTER H. KELLEY.